United States Patent
Yu et al.

(10) Patent No.: US 11,532,965 B2
(45) Date of Patent: Dec. 20, 2022

(54) ELECTRIC-MACHINE HOUSING STRUCTURE

(71) Applicant: Jing-Jin Electric Technologies Co., Ltd., Beijing (CN)

(72) Inventors: Ping Yu, Beijing (CN); Zhe Feng, Beijing (CN); Kui Yang, Beijing (CN); Haibin Wang, Beijing (CN); Kunxing Sun, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 44 days.

(21) Appl. No.: 17/302,990

(22) Filed: May 18, 2021

(65) Prior Publication Data

US 2021/0408864 A1    Dec. 30, 2021

(30) Foreign Application Priority Data

Jun. 30, 2020  (CN) .......................... 202010621101.6
Dec. 17, 2020  (CN) .......................... 202011498731.5

(51) Int. Cl.
  *H02K 5/20*  (2006.01)
  *H02K 1/20*  (2006.01)
  *H02K 5/24*  (2006.01)
  *H02K 9/28*  (2006.01)

(52) U.S. Cl.
  CPC ................. *H02K 5/20* (2013.01); *H02K 1/20* (2013.01); *H02K 5/24* (2013.01); *H02K 9/28* (2013.01)

(58) Field of Classification Search
  CPC  H02K 1/20; H02K 15/14; H02K 5/20; H02K 5/24; H02K 9/28
  See application file for complete search history.

(56) References Cited

U.S. PATENT DOCUMENTS 6,011,335 A  *  1/2000  Belley ....................... H02K 5/06
                                                              310/71
7,701,096 B2 *  4/2010  Noda ..................... B60L 3/0061
                                                              310/57
8,148,858 B2 *  4/2012  Hassett .................... H02K 9/18
                                                              310/58

(Continued)

FOREIGN PATENT DOCUMENTS

CN    102231579 A    11/2011
CN    102332782 A    1/2012

(Continued)

*Primary Examiner* — Naishadh N Desai
(74) *Attorney, Agent, or Firm* — LKGlobal | Lorenz & Kopf, LLP

(57) ABSTRACT

The present disclosure discloses an electric-machine housing structure, wherein the electric-machine housing structure includes an outer housing, an inner housing and a plurality of intermediate pieces provided between the outer housing and the inner housing; and the intermediate pieces are overall hollow arcuate structures or annular structures, upper surfaces and lower surfaces of the intermediate pieces are provided with a plurality of protrusions and/or grooves, the protrusions and/or grooves of the upper surfaces match with and are fixed to grooves and/or protrusions on an inner circumferential face of the outer housing, and the protrusions and/or grooves of the lower surfaces match with and are fixed to grooves and/or protrusions on an outer circumferential face of the inner housing.

17 Claims, 10 Drawing Sheets

(56) References Cited

U.S. PATENT DOCUMENTS

| | | | |
|---|---|---|---|
| 9,917,486 B2* | 3/2018 | Kirkley, Jr. | H02K 5/203 |
| 2011/0025155 A1 | 2/2011 | Kurosawa et al. | |
| 2012/0074798 A1* | 3/2012 | Bywaters | H02K 1/185 |
| | | | 310/216.113 |

FOREIGN PATENT DOCUMENTS

| | | | |
|---|---|---|---|
| CN | 104518614 A | | 4/2015 |
| CN | 205429948 U | | 8/2016 |
| CN | 106175584 A | | 12/2016 |
| CN | 206686018 U | | 11/2017 |
| CN | 107546907 A | | 1/2018 |
| CN | 206992845 U | | 2/2018 |
| CN | 107919762 A | | 4/2018 |
| CN | 107968518 A | | 4/2018 |
| CN | 108054861 A | | 5/2018 |
| CN | 208433851 U | | 1/2019 |
| CN | 208924004 U | | 5/2019 |
| CN | 209233631 U | | 8/2019 |
| CN | 209472471 U | | 10/2019 |
| CN | 209676057 U | | 11/2019 |
| CN | 110611394 A | | 12/2019 |
| CN | 209823545 U | | 12/2019 |
| CN | 111277069 A | | 6/2020 |
| CN | 216184360 U | * | 4/2022 |
| DE | 102014221492 A1 | | 4/2016 |
| DE | 102017202373 A1 | | 8/2018 |
| JP | S58144549 A | | 8/1983 |
| JP | H05103445 A | | 4/1993 |
| JP | H07163085 A | | 6/1995 |
| JP | H09322466 A | | 12/1997 |
| JP | 2010041835 A | | 2/2010 |
| WO | 2019034460 A1 | | 2/2019 |

\* cited by examiner

ELECTRIC-MACHINE HOUSING STRUCTURE

CROSS-REFERENCE TO RELATED APPLICATION

This application claims priority to Chinese Patent Application Nos. 202010621101.6, filed Jun. 30, 2020 and 202011498731.5, filed Dec. 17, 2020, which are each hereby incorporated herein by reference in their entirety.

TECHNICAL FIELD

This Application pertains to the technical field of electric machines, and particularly relates to an electric-machine housing structure.

BACKGROUND

Along with the development of the automobile industry, the NVH performance of vehicles has become a comprehensive technical index for quality evaluation of modern car manufacturing. NVH is the abbreviation of Noise, Vibration, Harshness. NVH influences the user experience of the vehicle users most directly and most surficially. The NVH problem of vehicles is one of the issues that gain the attention of large manufacturing enterprises of entire cars and component parts in the global car industry. Statistical data show that approximately ⅓ of the malfunctions of the entire car is related to the NVH problem of vehicles. The main energization sources that influence the magnitude of internal car noise include the components such as the engine, the electric motor, the reducer and the tyre. Regarding electric vehicles, the main energization source is from the electric motor. A vehicle uses many electric motors, so the study on the noise and vibration of electric motors has become increasingly more important. In conventional built-in damping-type electric machines, because the damping structure and the electric-machine housing are integral, such a type of electric-machine housings have the problems of a high difficulty in manufacturing, a long processing cycle, a high manufacturing cost and incapacity of mass production. In addition, other objects, desirable features and characteristics will become apparent from the subsequent summary and detailed description, and the appended claims, taken in conjunction with the accompanying drawings and this background.

SUMMARY

Aiming at the above problems, the present disclosure discloses an electric-machine housing structure, to overcome the above problems or at least partially solve the above problems.

In order to achieve the above objects, the present disclosure employs the following technical solutions:

The present disclosure discloses an electric-machine housing structure, wherein the electric-machine housing structure comprises an outer housing, an inner housing and a plurality of intermediate pieces provided between the outer housing and the inner housing; and the intermediate pieces are overall hollow arcuate structures or annular structures, upper surfaces and lower surfaces of the intermediate pieces are provided with a plurality of protrusions and/or grooves, the protrusions and/or grooves of the upper surfaces match with and are fixed to grooves and/or protrusions on an inner circumferential face of the outer housing, and the protrusions and/or grooves of the lower surfaces match with and are fixed to grooves and/or protrusions on an outer circumferential face of the inner housing.

Optionally, the inner circumferential face of the outer housing is provided with a plurality of axially extending first protrusions or grooves, the outer circumferential face of the inner housing is provided with a plurality of axially extending second protrusions or grooves, the upper surfaces of the intermediate pieces are provided with first grooves or protrusions that match with and are fixed to the first protrusions or grooves, and the lower surfaces of the intermediate pieces are provided with second grooves or protrusions that match with and are fixed to the second protrusions or grooves.

Optionally, a height of the first protrusions is greater than a depth of the first grooves, the inner circumferential face of the outer housing and two neighboring matching and fixing positions of the intermediate pieces form a first tunnel therebetween, and the first tunnel is empty or is filled with a damping medium.

Optionally, the hollow interior of each of the intermediate pieces forms a second tunnel, and the second tunnel is empty or is filled with a damping medium; and the intermediate piece is provided with an axially extending first catching groove at one side, and is provided with an axially extending first flange at the other side.

Optionally, the inner circumferential face of the outer housing is provided with a plurality of projecting sections, and each of the projecting sections is provided with an axially extending second catching groove at one side, and is provided with an axially extending second flange at the other side.

Optionally, the outer circumferential face of the inner housing and two neighboring matching and fixing positions of the intermediate pieces form a cooling tunnel therebetween.

Optionally, a length of the intermediate pieces is less than a length of the electric-machine housing structure, one of two neighboring intermediate pieces is provided at an edge position at one end of the electric-machine housing structure, and the other of the two neighboring intermediate pieces is provided at an edge position at the other end of the electric-machine housing structure.

Optionally, an aluminum ring is welded to an outside of the intermediate pieces, and the aluminum ring, the intermediate pieces and the outer circumferential face of the inner housing form an S-shaped or maze-shaped cooling channel.

Optionally, the inner housing, the intermediate pieces and the outer housing are made of aluminum alloy, and are manufactured by extrusion molding.

Optionally, fitting between the intermediate pieces and the outer housing and the inner housing is interference fitting; and/or, cross-sections of the hollow interiors of the intermediate pieces are of a trapezoidal shape, a parallelogram shape, an ellipsoid shape or an irregular shape formed by curves or straight lines.

Optionally, the plurality of intermediate pieces are integrally manufactured with the outer housing or the inner housing.

The advantages and advantageous effects of the present disclosure are as follows.

The electric-machine housing structure according to the present disclosure, by using the design of the outer housing, the inner housing and the plurality of intermediate pieces provided between the outer housing and the inner housing, can weaken the energization to the electric-machine housing by the vibration generated by the stator, and increase the damping coefficient of the electric-machine housing. Furthermore, the electric-machine housing structure according to the present disclosure has the advantages of a simple manufacturing process, a short processing cycle, a low manufacturing cost and mass production.

BRIEF DESCRIPTION OF THE DRAWINGS

The present invention will hereinafter be described in conjunction with the following drawing figures, wherein like numerals denote like elements, and.

Figure 1A:
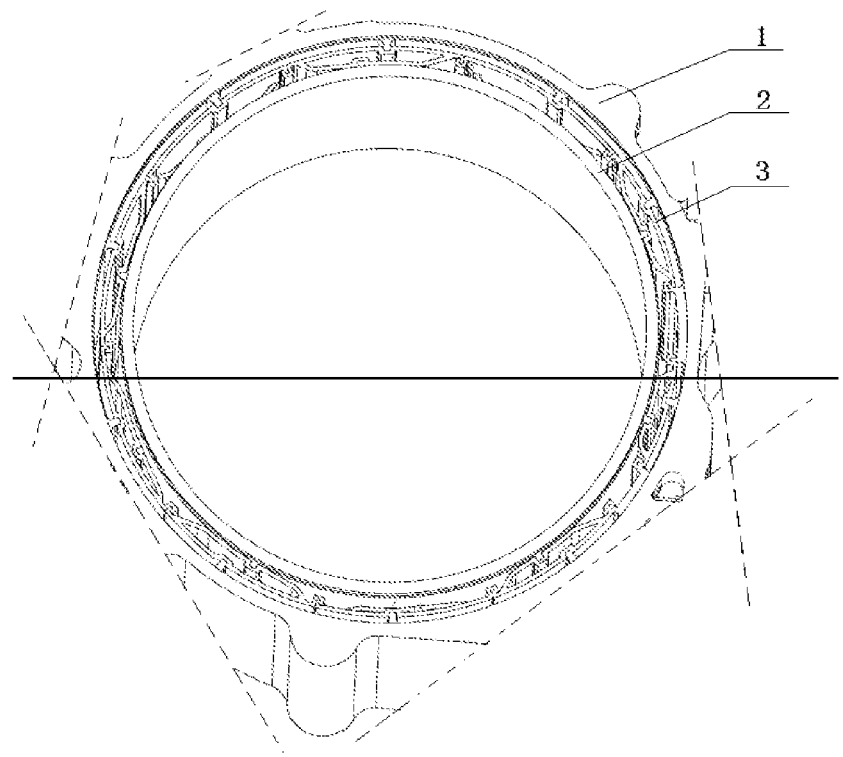
FIG. 1a is a perspective structural diagram of the electric-machine housing according to an embodiment of the present disclosure.
Figure 1B:
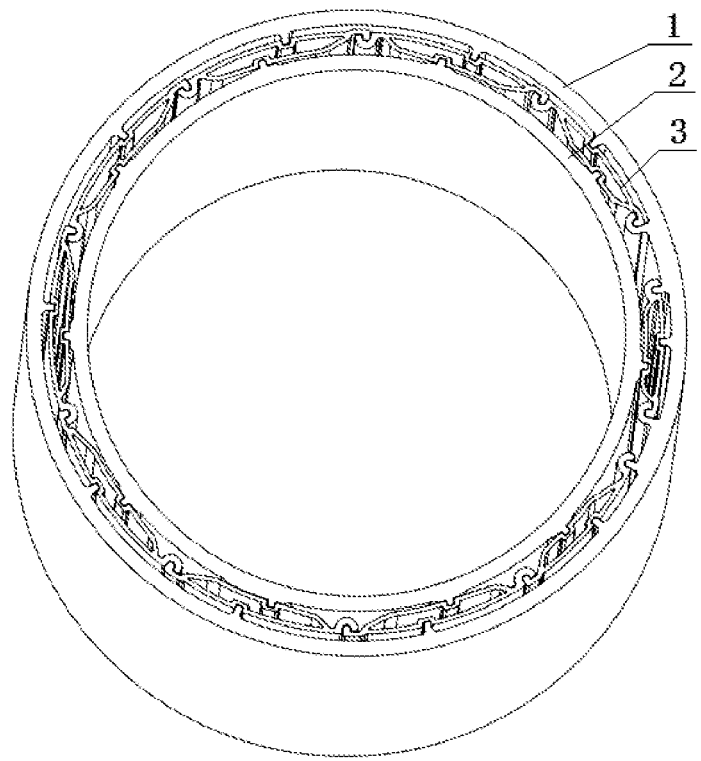
FIG. 1b is a perspective structural diagram of the electric-machine housing according to an embodiment of the present disclosure.

In the drawings: 1. outer housing, 2. inner housing, 3. intermediate pieces, 4. first protrusions, 5. second protrusions, 6. first grooves, 7. second grooves, 8. first tunnels, 9. second tunnels, 10. first catching groove, 11. first flange, 12. projecting sections, 13. second catching groove, 14. second flange, 15. cooling tunnel, and 16. aluminium ring.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objects, the technical solutions and the advantages of the present disclosure clearer, the technical solutions of the present disclosure will be clearly and completely described below with reference to the particular embodiments and the corresponding drawings of the present disclosure. Apparently, the described embodiments are merely certain embodiments of the present disclosure, rather than all of the embodiments. All of the other embodiments that a person skilled in the art obtains on the basis of the embodiments in the present disclosure without paying creative work fall within the protection scope of the present disclosure.

The technical solutions provided by the embodiments of the present disclosure will be described in detail below with reference to the drawings.

An embodiment of the present disclosure discloses an electric-machine housing structure. As shown in FIGS. 1a, 1b, 2a and 2b, the electric-machine housing structure comprises an outer housing 1, an inner housing 2 and a plurality of intermediate pieces 3 provided between the outer housing 1 and the inner housing 2.

It can be seen from FIGS. 1a, 1b, 2a and 2b that the intermediate pieces 3 are overall hollow arcuate structures or annular structures, the upper surfaces and the lower surfaces of the intermediate pieces 3 are provided with a plurality of protrusions and/or grooves, the protrusions and/or grooves of the upper surfaces match with and are fixed to grooves and/or protrusions on the inner circumferential face of the outer housing 1, and the protrusions and/or grooves of the lower surfaces match with and are fixed to grooves and/or protrusions on the outer circumferential face of the inner housing 2. The positions of the grooves and the protrusions may be exchanged. The matching and fixing between the grooves and the protrusions realizes the fixing of the intermediate pieces 3 to the outer housing 1 and the inner housing 2, which avoids the intermediate pieces 3 from shaking between the housings.

The electric-machine housing structure according to the present embodiment, by using the design of the outer housing 1, the inner housing 2 and the plurality of intermediate pieces 3 provided between the outer housing 1 and the inner housing 2, can weaken the energization to the electric-machine housing by the vibration generated by the stator, increase the damping coefficient of the electric-machine housing, reduce the response frequency of the electric-machine housing, weaken the paths of the transmission of vibration and noise, and reduce the amplitude values of electromagnetic force waves, thereby inhibiting vibration and noise, to improve the comfortableness felt by a human body. Furthermore, the outer housing 1, the inner housing 2 and the intermediate pieces 3 according to the present disclosure can be individually and separately formed, or the intermediate pieces 3 can be integrally formed with the outer housing 1 or the inner housing 2, which has the advantages of a simple manufacturing process, a short processing cycle, a low manufacturing cost and mass production.

Figure 5:
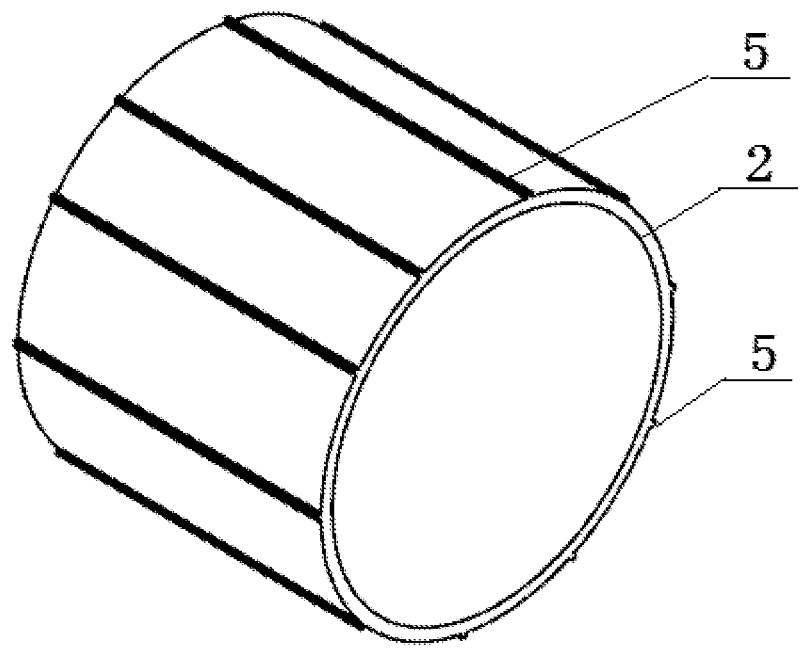
FIG. 5 is a perspective structural diagram of the inner housing according to an embodiment of the present disclosure.
Figure 6:
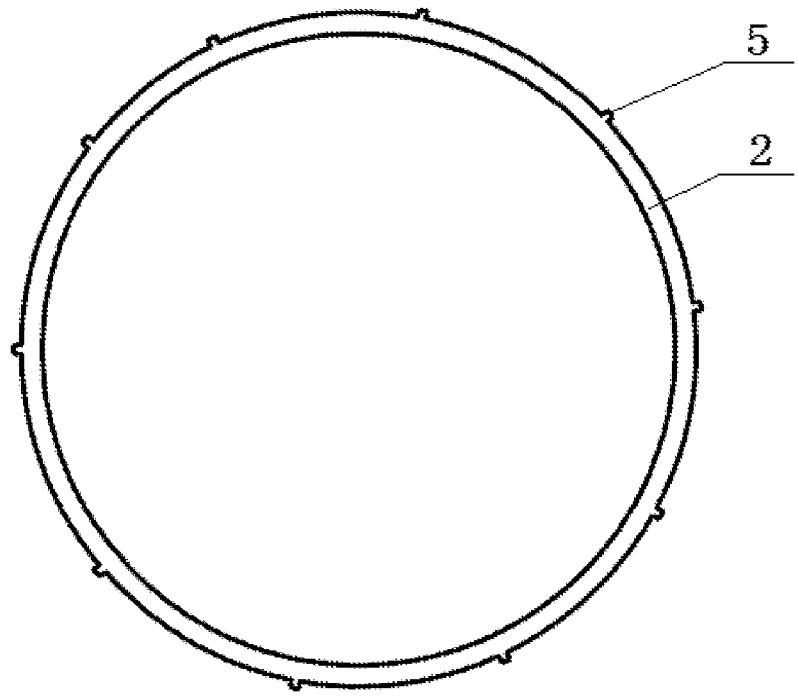
FIG. 6 is a radial sectional view of the inner housing according to an embodiment of the present disclosure.
Figure 7:
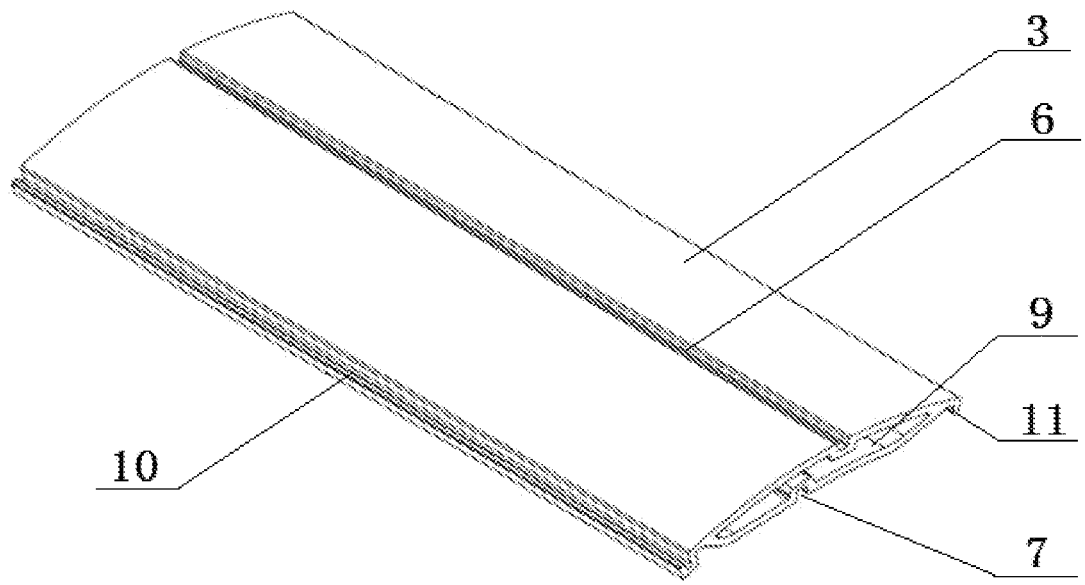
FIG. 7 is a perspective structural diagram of the intermediate piece according to an embodiment of the present disclosure.
Figure 8:
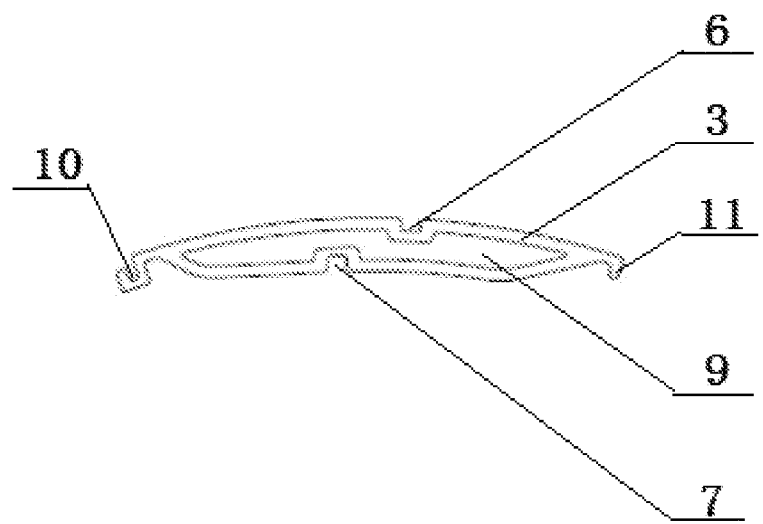
FIG. 8 is a cross-sectional view of the intermediate piece according to an embodiment of the present disclosure.

In an embodiment, as shown in FIGS. 3a, 3b, 4a and 4b, the inner circumferential face of the outer housing 1 is provided with a plurality of axially extending first protrusions 4. As shown in FIGS. 5 and 6, the outer circumferential face of the inner housing 2 is provided with a plurality of axially extending second protrusions 5. As shown in FIGS. 7 and 8, the upper surfaces of each of the intermediate pieces 3 is provided with a first groove 6 that matches with and is fixed to one of the first protrusions 4, the lower surface of the intermediate piece 3 is provided with a second groove 7 that matches with and is fixed to one of the second protrusions 5, the intermediate piece 3 may have one or more first grooves 6 and second grooves 7, and the quantities of the first protrusions 4 on the outer housing 1 and the second protrusions 5 on the inner housing 2 correspond and match. The above design of fixing structure can effectively avoid the intermediate pieces 3 from circumferentially rotating between the outer housing 1 and the inner housing 2. In the present embodiment, the positions of the protrusions and the grooves may be exchanged.

Figure 2A:
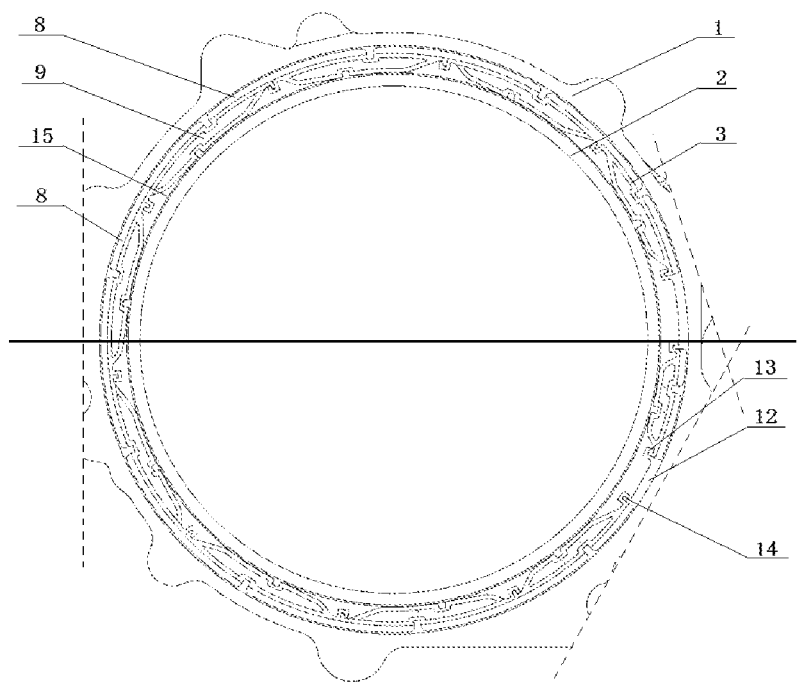
FIG. 2a is a radial sectional view of the electric-machine housing according to an embodiment of the present disclosure.
Figure 2B:
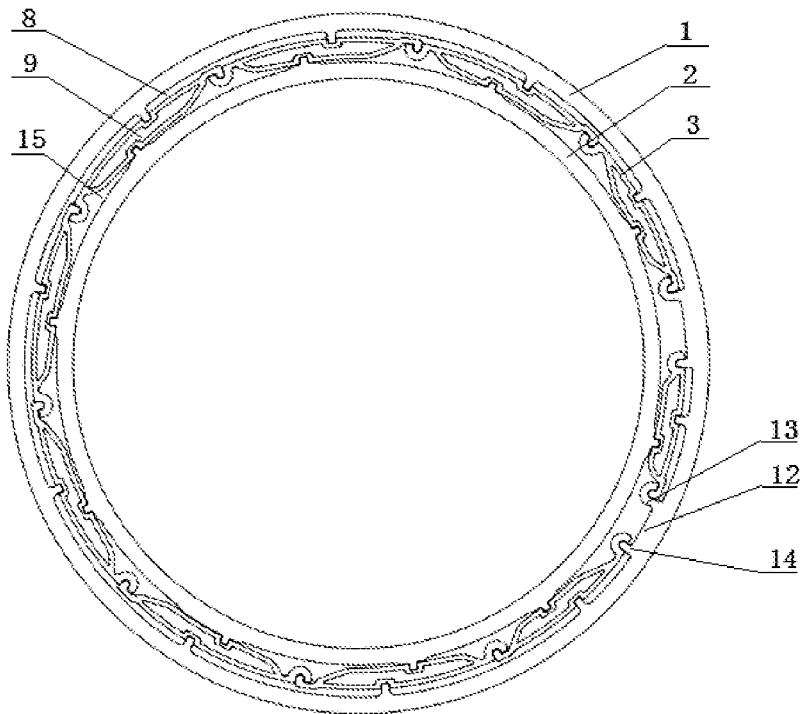
FIG. 2b is a radial sectional view of the electric-machine housing according to an embodiment of the present disclosure.
Figure 3A:
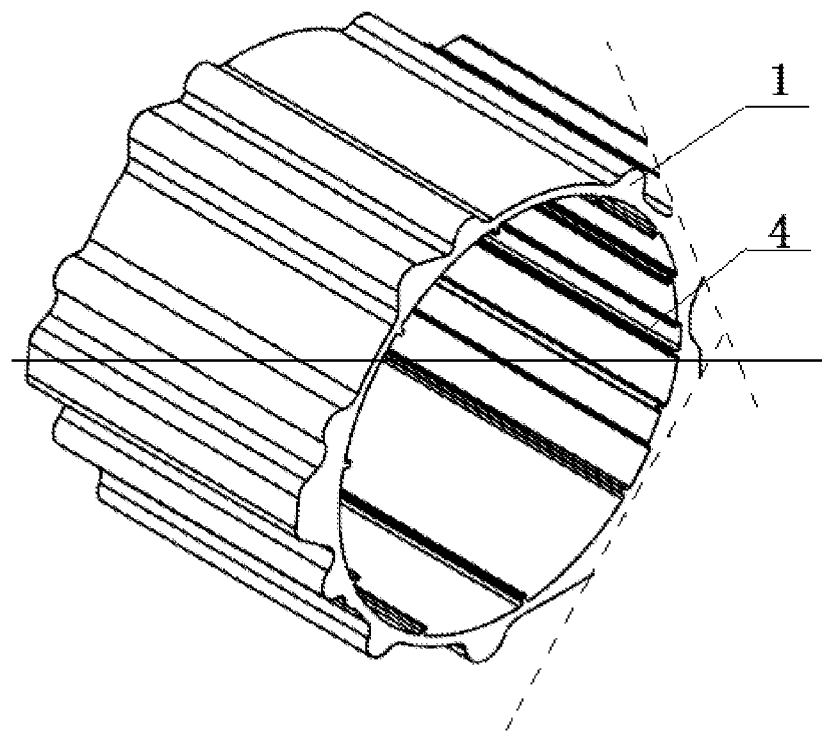
FIG. 3a is a perspective structural diagram of the outer housing according to an embodiment of the present disclosure.
Figure 3B:
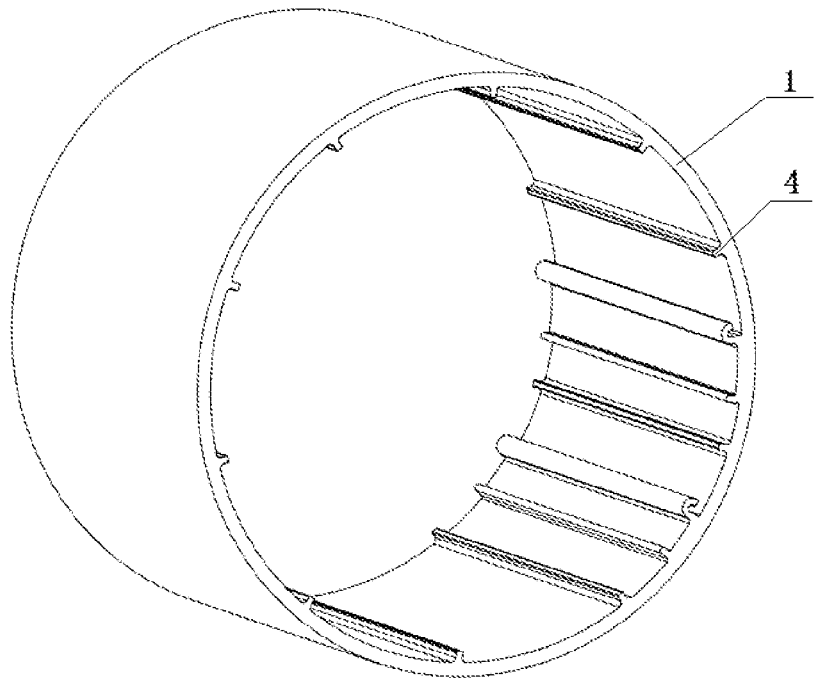
FIG. 3b is a perspective structural diagram of the outer housing according to an embodiment of the present disclosure.
Figure 4A:
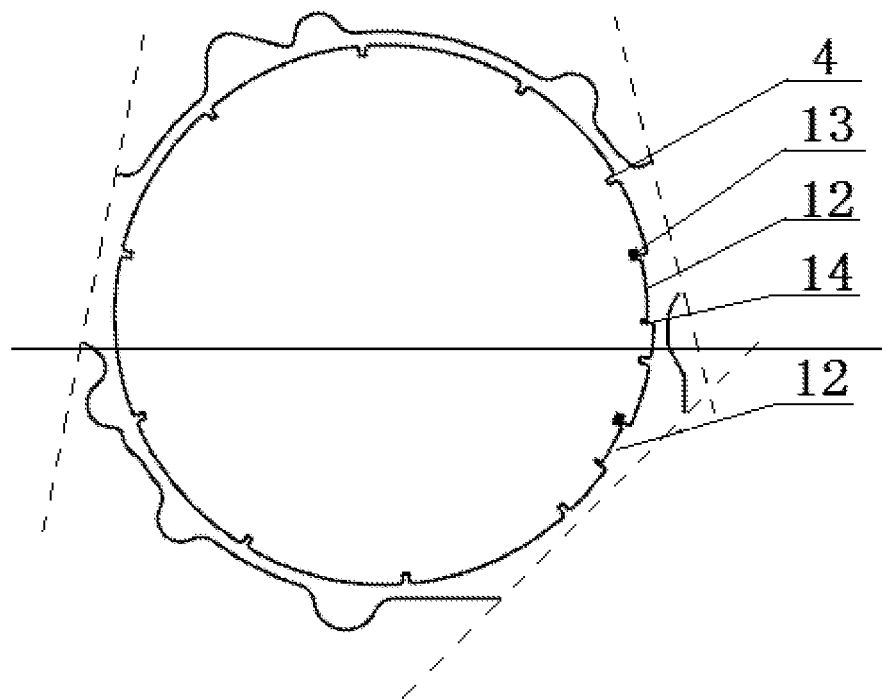
FIG. 4a is a radial sectional view of the outer housing according to an embodiment of the present disclosure.
Figure 4B:
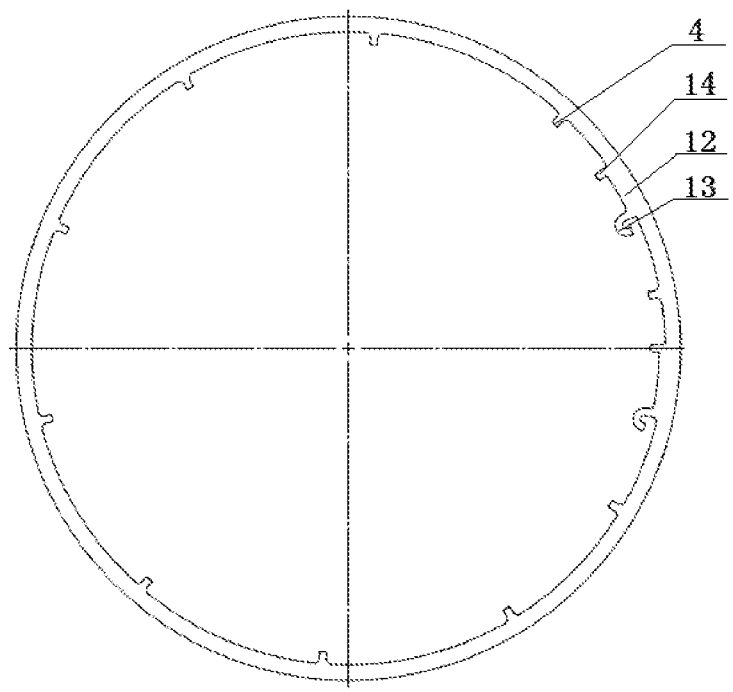
FIG. 4b is a radial sectional view of the outer housing according to an embodiment of the present disclosure.

In an embodiment, as shown in FIGS. 2a and 2b, the height of the first protrusions 4 is greater than the depth of the first grooves 6. Therefore, the inner circumferential face of the outer housing 1 does not contact the upper surfaces of the intermediate pieces 3, so that in turn the inner circumferential face of the outer housing 1 and two neighboring matching and fixing positions of the intermediate pieces 3 form a first tunnel 8 therebetween. The first tunnel 8 is empty or is filled with a damping medium. By providing the first tunnel 8, the noise and vibration that are generated when the rotor is rotating can be effectively absorbed. Most preferably, the damping medium is a solid damping medium, for example a resin is filled into the first tunnel 8, and after the resin has solidified the mutual fixing between the outer housing 1 and the intermediate pieces 3 can be realized.

In an embodiment, as shown in FIGS. 7 and 8, the hollow interior of each of the intermediate pieces 3 forms a second tunnel 9, and the second tunnel 9 is empty or is filled with a damping medium, the function of which is the same as that of the first tunnel 8. Most preferably, the damping medium is a solid damping medium. The intermediate piece 3 is provided with an axially extending first catching groove 10 at one side, and is provided with an axially extending first flange 11 at the other side. The first catching groove 10 can be exactly snap-fitted and fixed to the first flange 11 of another intermediate piece 3, which realizes the connection and fixing between two neighboring intermediate pieces 3.

In a preferable embodiment, as shown in FIGS. 2a, 2b, 4a and 4b, the inner circumferential face of the outer housing 1 is provided with a plurality of projecting sections 12, and each of the projecting sections 12 is provided with an axially extending second catching groove 13 at one side, and is provided with an axially extending second flange 14 at the other side. The second catching groove 13 may be snap-fitted to the first flange 11, the second flange 14 may be snap-fitted to the first catching groove 10, and the projecting sections 12 can also strengthen and fix the electric-machine housing. The second catching groove 13 and the second flange 14 can further fix the intermediate pieces 3. Particularly, there are two projecting sections 12, and the outer housing 1 is provided with a liquid inlet and a liquid outlet respectively at the positions of the two projecting sections 12, which facilitates a coolant to enter between the housings.

In an embodiment, the outer circumferential face of the inner housing 2 and two neighboring matching and fixing positions of the intermediate pieces 3 form a cooling tunnel 15 therebetween, and a coolant may be introduced into the cooling tunnel 15, which realizes the cooling of the electric-machine housing.

Figure 9:
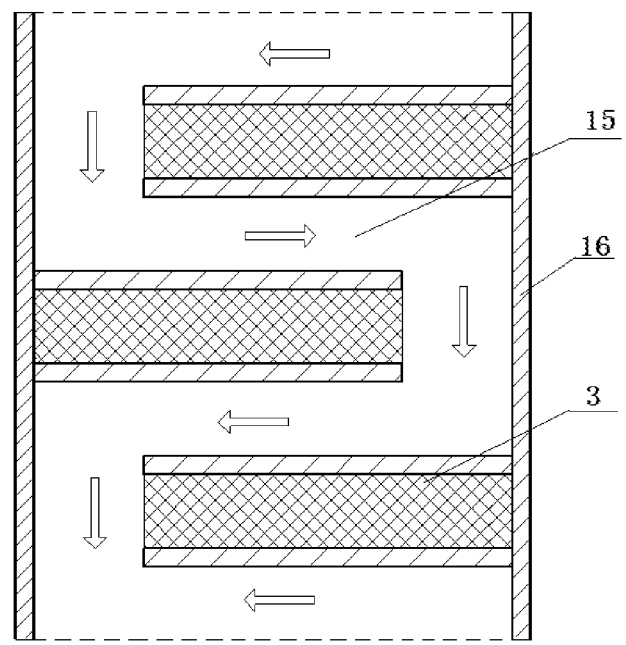
FIG. 9 is a schematic diagram of the cooling channel inside the electric-machine housing according to an embodiment of the present disclosure.

In an embodiment, the length of the intermediate pieces 3 is less than the length of the electric-machine housing structure. As shown in FIG. 9, one of two neighboring intermediate pieces 3 is provided at an edge position at one end of the electric-machine housing structure, and the other of the two neighboring intermediate pieces 3 is provided at an edge position at the other end of the electric-machine housing structure, so that each of the intermediate pieces 3 can merely be aligned with an edge position at one end of the electric-machine housing structure, and has a certain gap from the edge position of the other end, which gap enables two neighboring cooling tunnels 15 to be intercommunicated.

Figure 10:
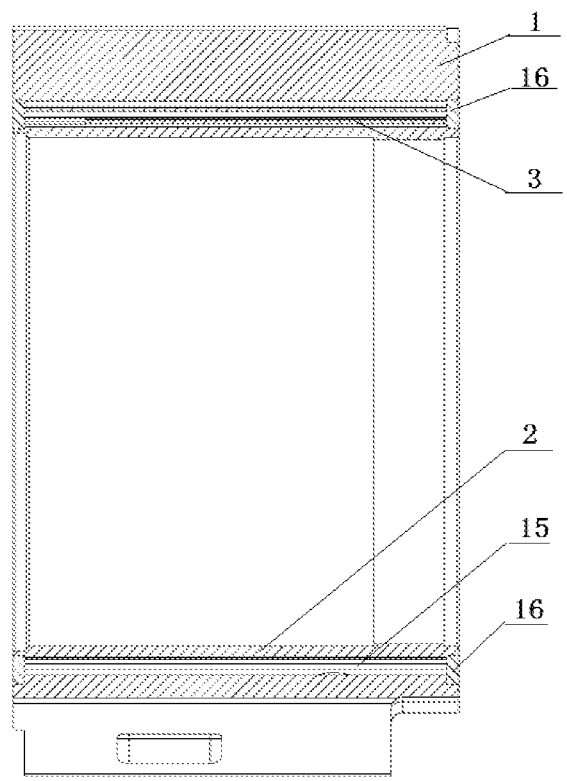
FIG. 10 is an axial sectional view of the electric-machine housing according to an embodiment of the present disclosure.

In an embodiment, as shown in FIG. 10, an aluminum ring 16 is welded to the outside of the intermediate pieces 3, and the aluminum ring 16 is also welded to the outer housing 1 and the inner housing 2 to realize the sealing between the outer housing 1 and the inner housing 2 of the electric machine. After the aluminum ring 16 has made the sealing, one end of each of the intermediate pieces 3 abuts the aluminum ring 16, the other end and the opposite aluminum ring 16 form a circumferential channel, and the aluminum rings 16, the intermediate pieces 3 and the outer circumferential face of the inner housing 2 form an S-shaped or maze-shaped cooling channel. The structure of the cooling channel is shown in FIG. 9, wherein the cooling channel is formed by a plurality of circumferential channels and cooling tunnels, and the coolant enters the cooling tunnel via the liquid inlet, is circulated inside the cooling channel 15, and is discharged via the liquid outlet, to realize the cooling of the electric-machine housing. In addition, the outer housing 1 or the aluminum ring 16 is provided with the liquid inlet and the liquid outlet.

In a preferable embodiment, the inner housing 2, the intermediate pieces 3 and the outer housing 1 are made of aluminum alloy, and are manufactured by extrusion molding. By using extrusion molding, the outer housing 1, the inner housing 2 and the intermediate pieces 3 can be mass produced.

In an embodiment, the fitting between the intermediate pieces 3 and the outer housing 1 and the inner housing 2 is interference fitting. The interference fitting enables the connections between the intermediate pieces 3 and the outer housing 1 and the inner housing 2 to be tighter, to avoid the relative loosening of the intermediate pieces 3. Additionally or alternatively, the cross-sections of the hollow interiors of the intermediate pieces 3 may be of a trapezoidal shape, a parallelogram shape, an ellipsoid shape or an irregular shape formed by curves or straight lines, and the cross-sectional shapes of the hollow interiors of the intermediate pieces 3 may be adjusted according to the practical demands.

Figure 11:
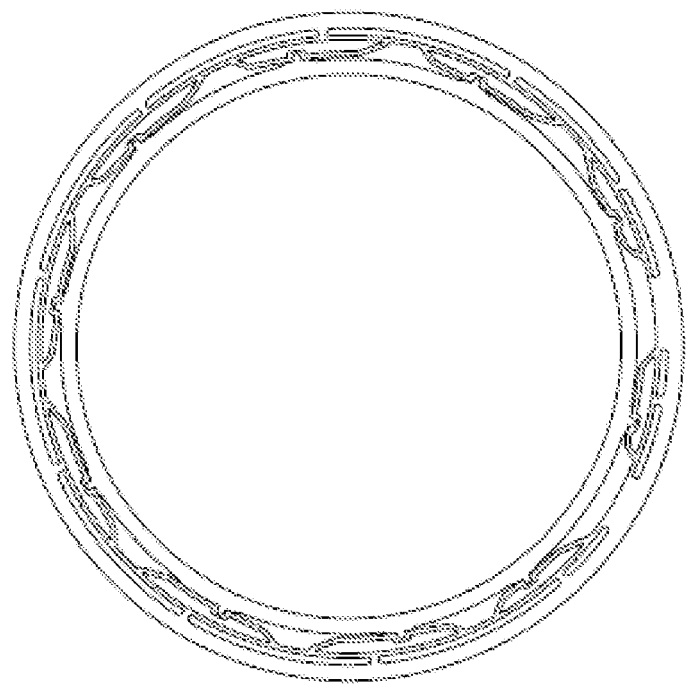
FIG. 11 is a radial sectional view of the electric-machine housing according to an embodiment of the present disclosure.
Figure 12:
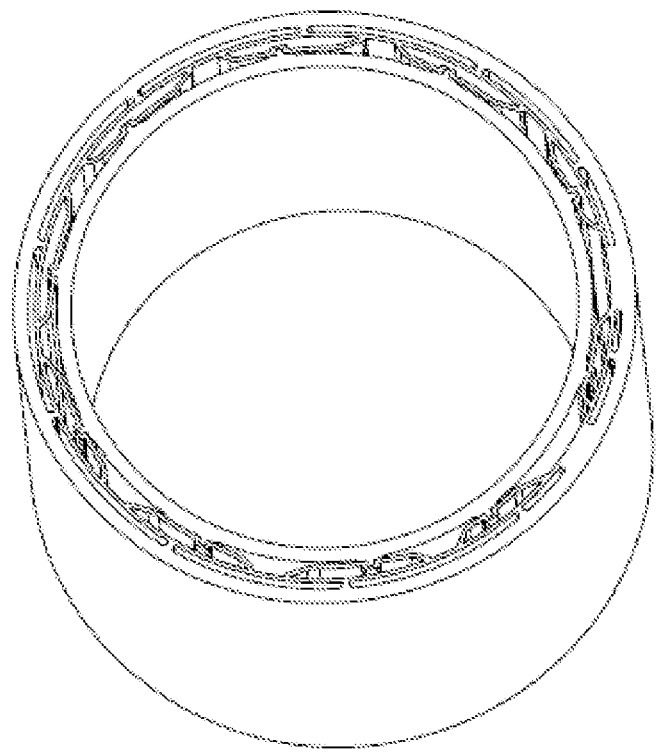
FIG. 12 is a perspective structural diagram of the electric-machine housing according to an embodiment of the present disclosure.
Figure 13:
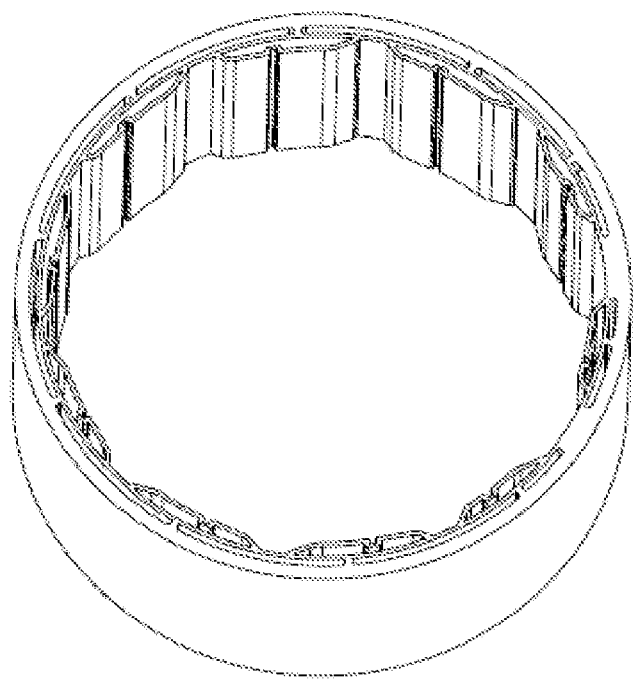
FIG. 13 is a perspective structural diagram of the integral intermediate pieces and outer housing according to an embodiment of the present disclosure.
Figure 14:
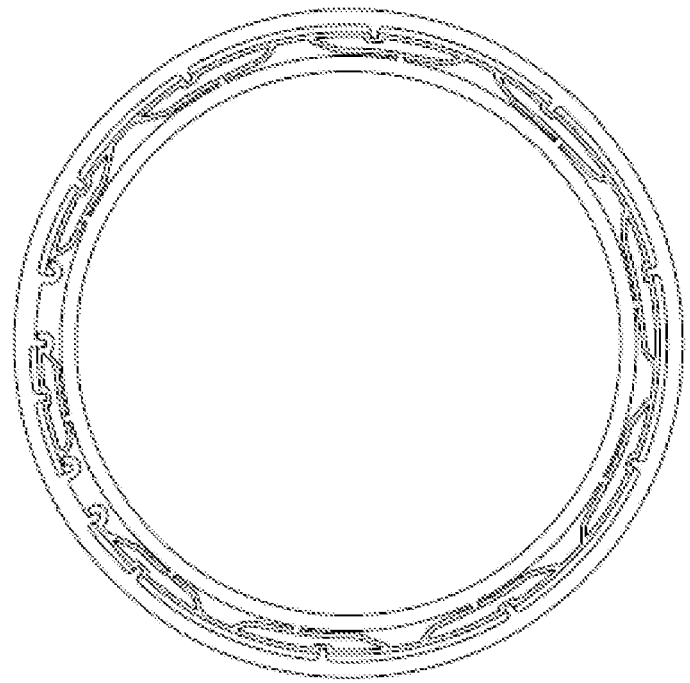
FIG. 14 is a radial sectional view of the electric-machine housing according to an embodiment of the present disclosure.
Figure 15:
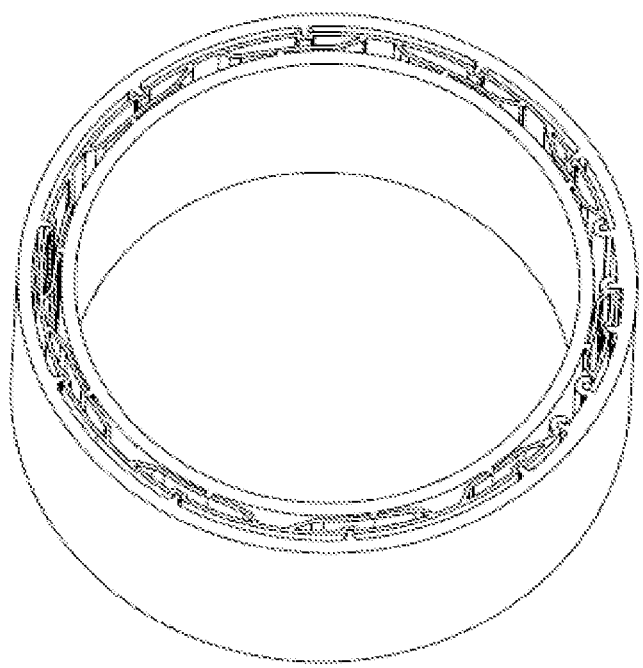
FIG. 15 is a perspective structural diagram of the electric-machine housing according to an embodiment of the present disclosure.
Figure 16:
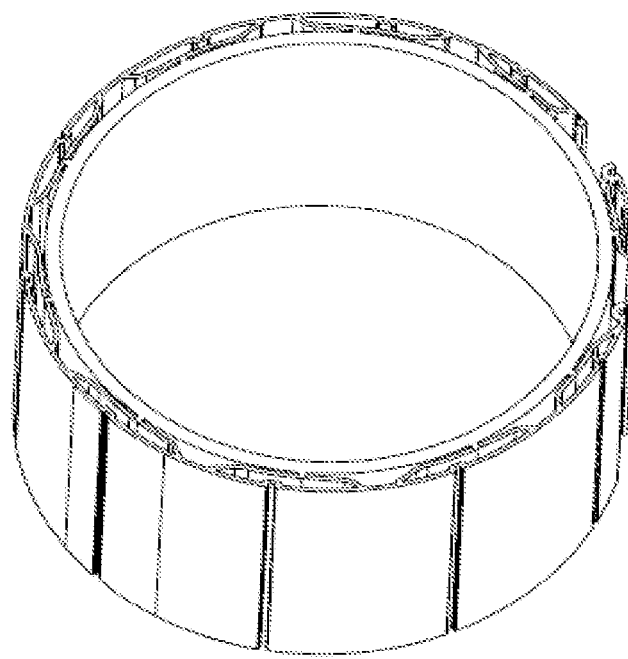
FIG. 16 is a perspective structural diagram of the integral intermediate pieces and inner housing according to an embodiment of the present disclosure.

In an embodiment, the neighboring intermediate pieces 3 may be fixedly connected. The particular mode may comprise independently manufacturing the plurality of intermediate pieces 3, and then fixedly connecting them by welding or in another manner, or may comprise integrally manufacturing the plurality of intermediate pieces 3. When the outer housing 1 and the intermediate pieces 3 are integrally manufactured, as shown in FIGS. 11-13, the assembling of the electric-machine housing is realized by the insertion connection with the inner housing 2. When the inner housing 2 and the intermediate pieces 3 are integrally manufactured, as shown in FIGS. 14-16, the assembling of the electric-machine housing is realized by the insertion connection with the outer housing 1.

The process for assembling the electric-machine housing structure according to the present disclosure comprises the following steps:

when the intermediate pieces 3 are individually and separately manufactured:

firstly, inserting and assembling the plurality of intermediate pieces 3 sequentially between the outer housing 1 and the inner housing 2, and adjusting their positions;

then, filling a resin into the formed first tunnels and second tunnels, and standing till the resin has cooled and solidified; and finally, welding the aluminium rings 16 to the inner housing and the outer housing, to realize the sealing at the two ends of the housings; or when the intermediate pieces 3 are integrally manufactured with the outer housing 1 or the inner housing 2:

firstly, insertion-connecting the outer housing 1 or the inner housing 2 integrally manufactured with the intermediate pieces 3 to the inner housing 2 or the outer housing 1 respectively, and adjusting their positions;

then, filling a resin into the formed first tunnels and second tunnels, and standing till the resin has cooled and solidified; and finally, welding the aluminium rings 16 to the inner housing and the outer housing, to realize the sealing at the two ends of the housings.

In conclusion, the present disclosure discloses an electric-machine housing structure, wherein the electric-machine housing structure comprises an outer housing, an inner housing and a plurality of intermediate pieces provided between the outer housing and the inner housing; and the intermediate pieces are overall hollow arcuate structures or annular structures, upper surfaces and lower surfaces of the intermediate pieces are provided with a plurality of protrusions and/or grooves, the protrusions and/or grooves of the upper surfaces match with and are fixed to grooves and/or protrusions on an inner circumferential face of the outer housing, and the protrusions and/or grooves of the lower surfaces match with and are fixed to grooves and/or protrusions on an outer circumferential face of the inner housing. The electric-machine housing structure according to the present disclosure, by using the design of the outer housing, the inner housing and the plurality of intermediate pieces provided between the outer housing and the inner housing, can weaken the energization to the electric-machine housing by the vibration generated by the stator, and increase the damping coefficient of the electric-machine housing. Furthermore, the outer housing, the inner housing and the intermediate pieces according to the present disclosure can be individually and separately formed, or be integrally formed, and have the advantages of a simple manufacturing process, a short processing cycle, a low manufacturing cost and mass production The above are merely particular embodiments of the present disclosure. By the teaching of the present disclosure, a person skilled in the art can make other modifications or variations on the basis of the above embodiments. A person skilled in the art should understand that the above particular descriptions are only for the purpose of better interpreting the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An electric-machine housing structure, wherein the electric-machine housing structure comprises an outer housing, an inner housing and a plurality of intermediate pieces provided between the outer housing and the inner housing; and the intermediate pieces are overall hollow arcuate structures or annular structures, upper surfaces and lower surfaces of the intermediate pieces are provided with a plurality of protrusions and/or grooves, the protrusions and/or grooves of the upper surfaces match with and are fixed to grooves and/or protrusions on an inner circumferential face of the outer housing, and the protrusions and/or grooves of the lower surfaces match with and are fixed to grooves and/or protrusions on an outer circumferential face of the inner housing.

2. The electric-machine housing structure according to claim 1, wherein the inner circumferential face of the outer housing is provided with a plurality of axially extending first protrusions or grooves, the outer circumferential face of the inner housing is provided with a plurality of axially extending second protrusions or grooves, the upper surfaces of the intermediate pieces are provided with first grooves or protrusions that match with and are fixed to the first protrusions or grooves, and the lower surfaces of the intermediate pieces are provided with second grooves or protrusions that match with and are fixed to the second protrusions or grooves.

3. The electric-machine housing structure according to claim 2, wherein a height of the first protrusions is greater than a depth of the first grooves, the inner circumferential face of the outer housing and two neighboring matching and fixing positions of the intermediate pieces form a first tunnel therebetween, and the first tunnel is empty or is filled with a damping medium.

4. The electric-machine housing structure according to claim 1, wherein the hollow interior of each of the intermediate pieces forms a second tunnel, and the second tunnel is empty or is filled with a damping medium; and the intermediate piece is provided with an axially extending first catching groove at one side, and is provided with an axially extending first flange at the other side.

5. The electric-machine housing structure according to claim 4, wherein the inner circumferential face of the outer housing is provided with a plurality of projecting sections, and each of the projecting sections is provided with an axially extending second catching groove at one side, and is provided with an axially extending second flange at the other side.

6. The electric-machine housing structure according to claim 1, wherein the outer circumferential face of the inner housing and two neighboring matching and fixing positions of the intermediate pieces form a cooling tunnel therebetween.

7. The electric-machine housing structure according to claim 6, wherein a length of the intermediate pieces is less than a length of the electric-machine housing structure, one of two neighboring intermediate pieces is provided at an edge position at one end of the electric-machine housing structure, and the other of the two neighboring intermediate pieces is provided at an edge position at the other end of the electric-machine housing structure.

8. The electric-machine housing structure according to claim 7, wherein an aluminum ring is welded to an outside of the intermediate pieces, and the aluminum ring, the intermediate pieces and the outer circumferential face of the inner housing form an S-shaped or maze-shaped cooling channel.

9. The electric-machine housing structure according to claim 1, wherein the inner housing, the intermediate pieces and the outer housing are made of aluminum alloy, and are manufactured by extrusion molding.

10. The electric-machine housing structure according to claim 1, wherein fitting between the intermediate pieces and the outer housing and the inner housing is interference fitting; and/or, cross-sections of the hollow interiors of the intermediate pieces are of a trapezoidal shape, a parallelogram shape, an ellipsoid shape or an irregular shape formed by curves or straight lines.

11. The electric-machine housing structure according to claim 1, wherein the plurality of intermediate pieces are integrally manufactured with the outer housing or the inner housing.

12. The electric-machine housing structure according to claim 2, wherein the inner housing, the intermediate pieces and the outer housing are made of aluminum alloy, and are manufactured by extrusion molding.

13. The electric-machine housing structure according to claim 4, wherein the inner housing, the intermediate pieces and the outer housing are made of aluminum alloy, and are manufactured by extrusion molding.

14. The electric-machine housing structure according to claim 6, wherein the inner housing, the intermediate pieces and the outer housing are made of aluminum alloy, and are manufactured by extrusion molding.

15. The electric-machine housing structure according to claim 2, wherein fitting between the intermediate pieces and the outer housing and the inner housing is interference fitting; and/or, cross-sections of the hollow interiors of the intermediate pieces are of a trapezoidal shape, a parallelogram shape, an ellipsoid shape or an irregular shape formed by curves or straight lines.

16. The electric-machine housing structure according to claim 4, wherein fitting between the intermediate pieces and the outer housing and the inner housing is interference fitting; and/or, cross-sections of the hollow interiors of the intermediate pieces are of a trapezoidal shape, a parallelogram shape, an ellipsoid shape or an irregular shape formed by curves or straight lines.

17. The electric-machine housing structure according to claim 6, wherein fitting between the intermediate pieces and the outer housing and the inner housing is interference fitting; and/or, cross-sections of the hollow interiors of the intermediate pieces are of a trapezoidal shape, a parallelogram shape, an ellipsoid shape or an irregular shape formed by curves or straight lines.

\* \* \* \* \*